United States Patent [19]

Wang et al.

[11] 4,370,739
[45] Jan. 25, 1983

[54] SPINEL VIDEO DISC PLAYBACK STYLUS

[75] Inventors: Chih C. Wang, Hightstown; Harry L. Pinch, Princeton; Ronald F. Bates, Trenton, all of N.J.

[73] Assignee: RCA Corporation, New York, N.Y.

[21] Appl. No.: 158,062

[22] Filed: Jun. 9, 1980

[51] Int. Cl.³ .......................... G11B 9/06; G11B 3/44
[52] U.S. Cl. .................................. 369/126; 369/173
[58] Field of Search ............... 369/126, 130, 173; 106/42; 358/128.5–128.6

[56] References Cited

U.S. PATENT DOCUMENTS

| 2,659,181 | 11/1953 | Yenni et al. | 369/173 |
|---|---|---|---|
| 3,472,615 | 10/1969 | Wang | 23/52 |
| 3,736,158 | 5/1973 | Cullen et al. | 106/42 |
| 3,842,194 | 10/1974 | Clemens | 369/126 |
| 3,877,705 | 4/1975 | Joschko et al. | 369/130 |
| 4,037,253 | 7/1977 | Nagaoka | 369/130 |
| 4,056,457 | 11/1977 | Vossen, Jr. | 369/126 |
| 4,104,832 | 8/1978 | Keizer | 51/281 R |
| 4,120,742 | 10/1978 | Asano et al. | 369/126 |
| 4,162,510 | 7/1979 | Keizer | 369/126 |

OTHER PUBLICATIONS

Cullen and Wang, Heteroepitaxial Semiconductors for Electronic Devices, Springer-Verlag, N. Y., 1978, pp. 10–11, 112–113, 124–138.
Wang, The Growth and Characterization of Spinel Single Crystals for Substrate Use in Integrated Electronics, J. of Applied Physics vol. 40, No. 9, pp. 3433–3444, 8/69.
Wang et al., Dielectric and Optical Prospesties of Stoichometric Magnesium Aluminate Spinel Single Crystals, J. of the Electromechanical Soc. vol. 118, pp. 586–591, 4/71.
Missel, Application of Sputtering to the Deposition of Films, Chapter 4 of Handbook of Thin Film Technology, McGraw-Hill Book Co. 1970.
Kernowsky et al., Scratch Test for Measuring Adherence of Thin Films to Oxide Substrates, Review of Scientific Instruments, vol. 35, No. 10, pp. 1324–1326, 10/64.

*Primary Examiner*—Raymond F. Cardillo, Jr.
*Attorney, Agent, or Firm*—Birgit E. Morris; Joseph D. Lazar

[57] ABSTRACT

An improved information storage and playback system comprising a playback stylus and a disc record. The information is recorded in the surface of the disc record and there is relative motion between the disc and the playback stylus during recovery of the recorded information. The stylus is fabricated out of a dielectric support material and contacts the record disc surface during the recovery of the information. The improvement comprises employing a playback stylus whose dielectric support material is single crystal magnesium aluminate spinel. The spinel composition comprises a ratio of MgO to $Al_2O_3$ of from about 1:1 to about 1:2.5.

4 Claims, 3 Drawing Figures

SPINEL VIDEO DISC PLAYBACK STYLUS

This invention relates to a video disc playback styli. More particularly, this invention relates to video disc styli fabricated out of single crystal magnesium aluminate spinel.

BACKGROUND OF THE INVENTION

Video disc styli are generally fabricated out of single crystal dielecric support materials such as diamond or sapphire ($\alpha$-$Al_2O_3$). When a capacitive playback system is used, with either a grooved or non-grooved video disc, the stylus dielectric support material is coated on at least one surface with a conductive metal layer. If a pressure pickup playback system is utilized, then at least one surface of the stylus dielectric support material is joined to a piezoelectrical material.

U.S. Pat. No. 3,842,194 of Clemens discloses a video disc having a playback system utilizing variable capacitance. In one configuration of the Clemen's system information representative of recorded picture and sound is encoded in the form of a relief pattern in a relatively fine spiral groove on the surface of a disc record. For example, groove widths of about 3.5 micrometers and groove depths of about 1.0 micrometer may be used. During playback a pickup stylus about 2.0 micrometers wide having a thin conductive electrode thereon, for example, about 0.2 micrometer thick, engages the groove as the record is rotated by a supportive turntable. Capacitive variations between the stylus electrode and the disc record surface are sensed to recover the pre-recorded information. In systems of the above type, the use of a relatively fine record groove and groove engaging requirements for the pickup stylus results in a stylus tip which is extremely small. Another capacitive playback system does not utilize grooves but relies on signals recorded in the disc record to keep the stylus in its proper position.

In U.S. Pat. No. 4,104,832 of Keizer, a method is disclosed whereby a pyramidal-shaped support element is shaped by an abrasive lapping disc to form a capacitive video disc stylus having a novel keel-tipped structure. The keel-tipped pickup stylus comprises a dielectric support element having a tapered body, a constricted terminal portion and shoulders interconnecting the body with a constricted terminal portion.

With the presently available stylus materials such as diamond and sapphire, properties such as ease of fabrication, cost of materials, usable life of the stylus, adherence of a conductive layer to the stylus surface and compatibility with the disc surface must be balanced. It would therefore be desirable to have an alternate choice of stylus material which may result in a better balance of these properties to produce a more desirable playback stylus.

BRIEF DESCRIPTION OF THE INVENTION

We have invented an improved information storage and playback system comprising a playback stylus and a disc record. The information is recorded in the surface of the disc record and there is relative motion between the disc and the playback stylus during recovery of the recorded information. The stylus is fabricated out of a dielectric support material and contacts the record disc during the recovery of the information. The improvement comprises employing a playback stylus whose dielectric support material is a single crystal magnesium aluminate spinel. The spinel composition comprises a ratio of MgO to $Al_2O_3$ of from about 1:1 to about 1:2.5.

DETAILED DESCRIPTION OF THE INVENTION

Figure 1:
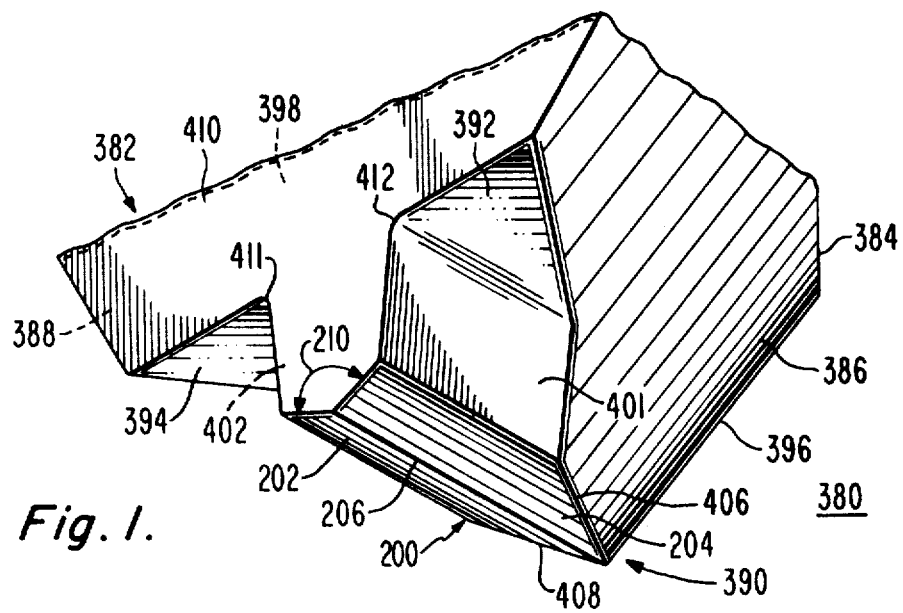
FIGS. 1 and 2 are perspective views of a keel-tipped capacitive playback stylus.

A magnesium aluminate spinel is a single crystalline solid solution of MgO and $Al_2O_3$. The crystal structure is face-centered cubic. The stoichiometric composition, which corresponds to a one-to-one molar ratio of MgO and $Al_2O_3$ has the formula $MgAl_2O_4$. Other magnesium aluminate spinels can be grown which are rich in $Al_2O_3$ or MgO. We have found that molar compositions in the range from about 1 MgO:1 $Al_2O_3$ to about 1 MgO:2.5 $Al_2O_3$ are suitable for use as video disc playback stylus dielectric support materials. Compositions richer in $Al_2O_3$, that is the ratio of $Al_2O_3$ to MgO is greater than 2.5:1, have been found to be mechanically and thermally unstable and therefore not suitable for use in styli. Materials richer in MgO, that is the ratio of MgO to $Al_2O_3$ is greater than 1:1, are generally inhomogeneous and polycrystalline and therefore are not suitable for fabricating styli.

Magnesium aluminate spinels may be grown using a variety of techniques. Methods known to the art for growing spinels include the flux method, the Czochralski melt growth method and the Verneuil flame fusion method.

The method of growing spinel which is chosen depends upon the composition required. For example, the Czochralski melt growth method may be used to grow stoichiometric spinel single crystals but it is difficult to grow magnesium aluminate spinels richer in aluminum than a $MgO:Al_2O_3$ molar ratio of about 1:1.1 to 1:1.3. If the $Al_2O_3$ content is greater, the crystals tend to crack during or after growth and, thus, are not suitable for use in styli.

The flux method may be only used to grow magnesium aluminate spinel crystals of stoichiometric composition. A drawback of the flux method is the contamination of the spinel with the flux material. The flux tends to migrate to the surface of the spinel crystals when the crystals are heated, which may interfere with the metal deposition onto a surface of the spinel required for playback stylus applications.

The Verneuil flame fusion method has been generally used to grow ony aluminum rich spinels. The Al-rich spinels with the composition $MgO:xAl_2O_3$, wherein x may be varied from about 1 to about 2.5, may be heated during the sputtering of the metal layer without decomposition.

Because spinels have a face centered cubic structure, there is no asymmetry in their mechanical and thermal properties. Thus, in contrast to sapphire, which has a rhombohedral crystal structure, magnesium aluminate spinel crystals grown along the <111>, <110> or <100> directions may be used to fabricate playback styli. Spinel crystals grown along these directions are especially compatible with metal thin films having a cubic crystal structure.

Thin film conductive metal electrodes may be deposited by any method known in the art such as sputtering, evaporation, chemical vapor deposition, electroplating and the like. A useful method of metal deposition which has been carried out on the spinel is the conventional RF diode sputtering technique described by L. Maissel in *Handbook of Thin Film Technology*, L. Maissell and R. Galang, Editors, McGraw Hill Book Co., pp. 4-1 to 4-41 (1970). In order to produce metal films which adhered well to the spinel and which have a low impurity concentration, a sputtering system operated at low pressure, for example, $1 \times 10^{-7}$ torr or less is preferred. Such a system includes an internal liquid nitrogen trap within the sputtering chamber. Furthermore, it has been found that the spinel wafers from which styli may be formed are preferably heated in the sputtering chamber before metal layer deposition in order to obtain a strong metal to spinel bond.

Transition metals such as tantalum, titanium, hafnium and the like may be used for fabricating the metal electrode for capacitive pickup styli. Particularly useful because of superior adhesive and mechanical properties is the use of tantalum metal films deposited on a spinel surface with a (100) orientation. X-ray diffraction studies reveal that a pseudo-epitaxy may exist between the Ta layer, which is in the α-Ta cubic crystalline form, and magnesium aluminate spinel. There is a parallel orientation relationship between the (110) face of Ta and the (100) face of $MgO:Al_2O_3$. This pseudo-epitaxial relationship and the isotropic nature of the composite material may account for the good mechanical properties of the tantalum layer-spinel interface.

Electrical resistivity of the (110) tantalum films deposited upon (100) spinel face is generally in the range of 40-45 micro-ohm-centimeters. This value is close to the bulk resistivity of α-tantalum and is indicative of a high degree of purity and crystalline perfection. The undesirable β-Ta crystal form, which is a metastable phase with high resistivity, has not been found from the x-ray studies of the Ta magnesium aluminate spinel system.

Styli having any desired shape may be fabricated out of magnesium aluminate spinel and these styli may be used, for example, in capacitive or pressure pickup playback systems. Suitable capacitive video disc styli include the keel tip stylus disclosed by Keizer in U.S. Pat. No. 4,162,510, incorporated herein by reference, and the triangular stylus of Clemens, U.S. Pat. No. 3,842,194.

Figure 2:
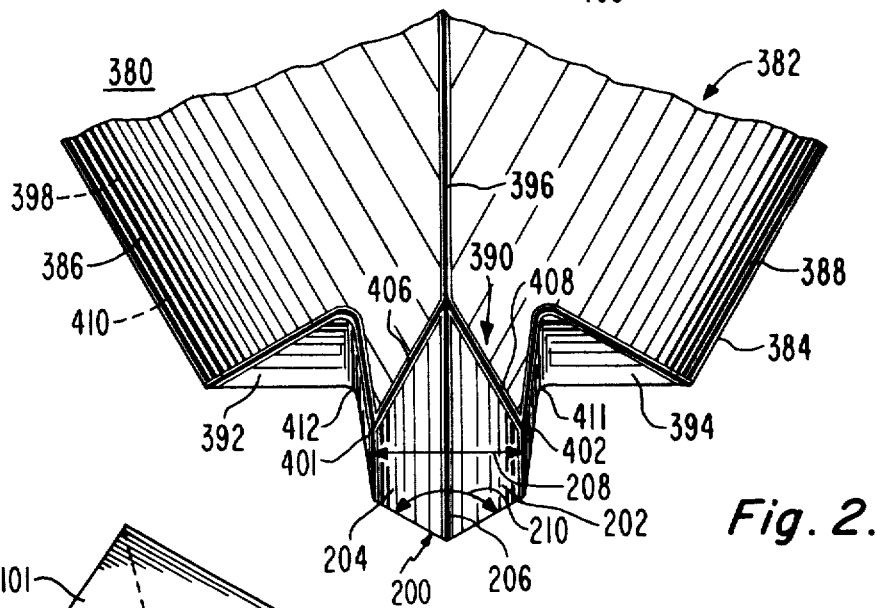

FIGS. 1 and 2 are perspective views of a keel-tipped stylus 380 whose bottom surface 200 is "V"-shaped for use with a "V"-shaped grooved video disc replica. It is to be understood, however, that the present invention is not limited to a stylus of any particular shape.

The keel-tipped stylus 380 includes a dielectric support element 382 which is fabricated out of a magnesium aluminate spinel. The dielectric support element 382 comprises a body 384 having bevelled surfaces 386 and 388, a constricted terminal portion 390 and shoulders 392 and 394 joining the bevelled body to the constricted terminal portion. The constricted terminal portion 390 is defined by a prow 396, a substantially flat rear surface 398 remote from the prow, a pair of substantially parallel side surfaces 401 and 402 extending from the side edges of the rear surface, a bottom surface 200 extending from the bottom edge of the rear surface and a pair of additional surfaces 406 and 408 extending from the prow and intersecting the bottom and the side surfaces. The stylus bottom surface 200 comprises a bottom edge 206 which rides along the apex of the groove. A first face 202 and a second face 204 follow the walls of the groove. The imaginary line 208 is perpendicular to the bottom edge 206, transverse to the groove and measures the width of the bottom surface 200. The width of the bottom surface 200 along the imaginary line 208 is less than the groove width of the video disc replica. A typical value for the bottom surface 200 width as measured by the imaginary line 208 is about 2 micrometers for a groove about 2.6 micrometers wide. The angle 210 which the first face 202 makes with the second face 204 at the bottom edge 206 preferably corresponds to that formed at the intersection of the groove wall, typically about 138 to 142 degrees, preferably about 140 degrees. The length of the bottom edge 206 is typically about 4-6 micrometers, preferably about 5 micrometers. The intersection of the rear, the side and the additional surfaces with the bottom surface 200 defines, illustratively, a pentagonal stylus footprint. The keel-tipped stylus is constructed such that an apex of the pentagonal footprint is located on the prow 396. An electrode 410, which may cover rear surface 398, may be a conducting layer about 1500-2000 angstroms thick. Metals such as titanium, hafnium, tantalum and the like may be used as the conducting layer.

In the embodiment of FIGS. 1 and 2, the shoulders 392 and 394 are parallel to the bottom surface of the constricted terminal portion 390. Alternatively, the shoulders 392 and 394 may be flared relative to the bottom surface. The concave junctions 411 and 412 are present at the intersections of the side faces 401 and 402, respectively, with the shoulders 392 and 394, respectively.

Figure 3:
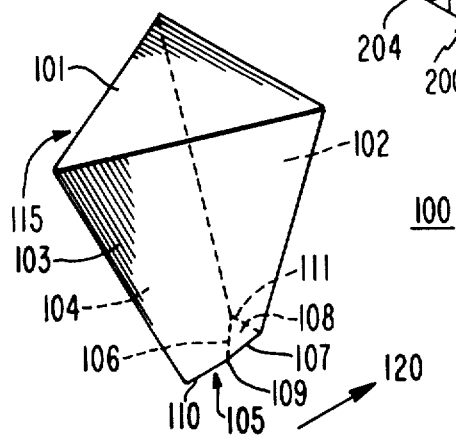
FIG. 3 is a perspective view of a pressure sensitive pickup stylus.

Spinel support material may be employed in a pressure sensitive pickup device using a piezoelectric component as described in T. Nagoka, U.S. Pat. No. 4,037,253. FIG. 3 is a perspective view of a pressure sensitive pickup stylus 100 disclosed by Nagoka. The stylus 100 is a modified tetrahedral support element 115 consisting of a top surface 101, back surface 102, first side surface 103 and second side surface 103. In the instant invention the support element 115 would be constructed out of magnesium aluminate spinel. A mechanical-electrical transducer (not shown) such as piezoelectric element is coupled to the top surface 101 of the dielectric support element. The bottom 105 of the support element 115 consists of a triangular scanning surface 108 and a leading edge 110. The triangular scanning surface 108 is defined by a back side 111, a first side 107, a second side 106 and apex 109. The direction of relative motion of the video disc replica which the sylus 100 engages is shown by the arrow 120.

For a pressure pickup stylus 100 a strongly adherent layer is needed in order to bond the piezoelectric element to the top surface 101 of the support element 115. Metal films such as tantalum or gold may be used as the bonding layer.

This invention will be further illustrated by the following Examples, but the invention is not meant to be limited to the details described therein.

EXAMPLE 1

A spinel single crystal boule was grown from the melt at about 2100° C. by the Czochralski method. The crystal composition was stoichiometric (1 MgO:1 Al$_2$O$_3$) as determined by wet chemical analysis. The crystal was free from subgrain and exhibited a typical dislocation density on the order of $10^3$ line/cm$^2$ as determined by x-ray topography. The crystal was thermally stable in that neither cracking nor decomposition was observed when it was heated to 1000° C.

The crystal was oriented for cutting by the conventional Laue x-ray back reflection method. Wafers of (111), (100) and (110) orientations were obtained by cutting the oriented crystal using a standard type diamond wheel, Model No. 152101, Selrex Co. An accuracy of better than 0.5 degree was maintained throughout the orientation and cutting operations.

The spinel wafers were mechanically lapped and polished to produce the flat and smooth surfaces. Lapping was carried out with about 30 micrometer boron carbide abrasive particles (available from the Norton Co.) to obtain a flat, coplanar surface. The lapped surface was further polished using successively finer grades of alumina (available from the Linde Co.), ending with the 0.3 micrometer grade. After polishing, the wafers generally have a flatness of better than ±0.4 micrometer per centimeter as determined by interferometry.

Deposition of Ta thin films on spinel was carried out by the radio frequency (RF) sputtering technique. The spinel wafers were held by spring clips to an anode plate spaced 5 cm above a 15.25 cm diameter Ta disc target. The main chamber of the planar diode RF deposition system was evacuated to a pressure of $1 \times 10^{-7}$ torr and then back filled with high purity argon (99.999+ percent pure, available from Scientific Gas Products, Inc.) to a pressure of $1 \times 10^{-2}$ torr. The anode plate was heated to 470° C. and kept at this temperature throughout the deposition process. The Ta target was presputtered behind a shutter for 1 hour. Deposition of Ta on the spinel wafers was carried for 40 minutes at a rate of 40 angstroms/minute at a forward power of 75 watts at a sheath potential of −800 volts. The Ta layer thickness was about 1600 angstroms.

The Ta film-MgO:Al$_2$O$_3$ composites were characterized for adhesion using a conventional microhardness tester (available from Hacker Instruments, Inc., Model SOPELEM OPL 5406) by observing the impressions introduced by a diamond point on the surfaces. See Karnowsky et al, "Scratch Test for Measuring Adherence of Thin Films to Oxide Substrates", *Review of Scientific Instrumentation*, Vol. 35, pp. 1324–1326 (1964) for a discussion of the scratch test method. The results shown in Table I indicated that the Ta films deposited on (100) spinel surfaces exhibited superior mechanical properties, in terms of surface hardness and interfacial adhesion than films deposited on the (111) or (110) spinel surfaces.

TABLE 1

| | SCRATCH TEST OF Ta FILM-SPINEL SUBSTRATE ADHESION | | |
|---|---|---|---|
| Metal Film Spinel Substrate | Critical Failure Load (g) | Film Flaking at 3g Load | Substrate Cutting at 3g Load |
| Ta/(111)Mg/Al$_2$O$_4$ | 2.0 | slight | slight |
| Ta/(110)MgAl$_2$O$_4$ | 0.8 | severe | severe |
| Ta/(100)MgAl$_2$O$_4$ | 4.8 | none | none |

The critical failure load is the number of grams which must be applied in order to form a continuous scratch mark on the metal film. Film flaking at a 3 gram load is a subjective measure of the adherence of the film to the substrate in areas not in the direct path of the scratch marker. The substrate cutting at a 3 gram load is the penetration of the scratch marker through the metal film to the substrate and the resultant cutting of the substrate. These three tests indicate that for a Ta film the (100) MgAl$_2$O$_4$ surface is the most adherent, followed by the (111) MgAl$_2$O$_4$ surface.

X-ray diffractometric studies revealed that the Ta deposited on spinel was cubic α-Ta. The metastable β-Ta was not found. A psuedo-epitaxy was found between the Ta films and the (100) spinel substrate surface with a parallel orientation relationship of (110) Ta // (100) spinel. Ta films deposited on (111) and (110) spinel surfaces exhibited random, non-pseudo-epitaxial orientations.

The DC-resistivity of the Ta films deposited on spinel was determined by the conventional 4-point probe method. The resistivity is in the range of 40–45 ohm-centimeter independent of substrate orientation.

EXAMPLE 2

Stoichiometric magnesium aluminate single crystals were grown, cut and polished as in Example 1. Using the same procedures as in Example 1 selected faces of the spinel were coated with about 2000 angstroms of hafnium. The adhesion of the film as shown in Table 2, was determined using the same microhardness test equipment and procedures as in Example 1.

TABLE 2

| | SCRATCH TEST OF Hf-FILM SPINEL SUBSTRATE ADHESION | | |
|---|---|---|---|
| Metal Film Spinel Substrate | Critical Failure Load (g) | Film Flaking at 3g Load | Substrate Cutting at 3g Load |
| Hf/(111)MgAl$_2$O$_4$ | 0.2 | severe | severe |
| Hf/(110)MgAl$_2$O$_4$ | 1.8 | slight | slight |
| Hf/(100)MgAl$_2$O$_4$ | 1.0 | severe | severe |

For Hf-spinel films the (110) face of the MgAl$_2$O$_4$ crystal provides the best adhesion followed by the (100) face. When compared to the Ta films of Example 1, the Hf films do not adhere as well as Ta on the (100) face of MgAl$_2$O$_4$. The preferred face, in terms of metal film adhesion, for any given metal must be empirically determined.

EXAMPLE 3

Triangular-shaped capacitive playback styli, as described in Clemens, U.S. Pat. No. 3,842,194, were fabricated from the stoichiometric spinel having a 1700 angstrom Ta film deposited on the (100) surface using the method of Example 1. After 20 plays on a conductive vinyl video disc having an about 200 angstrom polysiloxane lubricant coating, the stylus showed no signs of wear or chipping. In addition, the playback performance was good with carrier distress, that is, loss of signal, totalling less than 1 sec. per 30 minutes of playback.

We claim:

1. In an information storage and playback system comprising a playback stylus and a disc record wherein information is recorded in the surface of the disc record; wherein the stylus is fabricated out of a dielectric support material; wherein there is relative motion between the disc and the playback stylus during recovery of the recorded information; and wherein the stylus contacts the record disc surface during the recovery of the information;

the improvement wherein said stylus dielectric support material is single crystal magnesium aluminate spinel comprised of a ratio of MgO to Al$_2$O$_3$ of about 1:1 to about 1:2.5 and having a surface with a (100) orientation, and further comprising a conductive layer of epitaxial α-tantulum having a surface with a (110) orientation formed on said spinel (100) surface.

2. The system of claim 1 wherein said α-tantulum layer is epitaxially deposited by sputtering on said surface of spinel.

3. The system of claim 1 wherein the information is recovered by capacitive means.

4. The system of claim 1 wherein a spiral groove disc record is employed.

* * * * *